(12) United States Patent
Feuerlein et al.

(10) Patent No.: US 9,672,613 B2
(45) Date of Patent: Jun. 6, 2017

(54) DOSE- AND TIME-OPTIMIZED MONITORING OF BOLUS VALUES

(71) Applicant: SIEMENS AKTIENGESELLSCHAFT, Munich (DE)

(72) Inventors: Ute Feuerlein, Erlangen (DE); Robert Lapp, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 237 days.

(21) Appl. No.: 14/023,682

(22) Filed: Sep. 11, 2013

(65) Prior Publication Data

US 2014/0079307 A1 Mar. 20, 2014

(30) Foreign Application Priority Data

Sep. 20, 2012 (DE) .................. 10 2012 216 931

(51) Int. Cl.
*G06K 9/00* (2006.01)
*G06T 7/00* (2017.01)

(52) U.S. Cl.
CPC .......... *G06T 7/0012* (2013.01); *G06T 7/0016* (2013.01); *G06T 2207/10081* (2013.01); *G06T 2207/30004* (2013.01)

(58) Field of Classification Search
CPC ....... A61B 6/481; A61B 6/032; A61B 5/4848; A61B 6/00; A61B 2576/00; A61B 8/085;
(Continued)

(56) References Cited

U.S. PATENT DOCUMENTS 5,544,215 A * 8/1996 Shroy, Jr. ............... A61B 6/481
348/E5.089
6,337,992 B1 * 1/2002 Gelman ..................... 600/425
(Continued)

FOREIGN PATENT DOCUMENTS

CN 1488317 A 4/2004
CN 1820710 A 8/2006
(Continued)

OTHER PUBLICATIONS

Cai et al., Adaptive Bolus Chasing Computed Tomography Angiography: Control Scheme and Experimental Results, Oct. 2008, Biomed Signal Process Control. Oct. 2008; 3(4): 319-326, pp. 1-24.*
(Continued)

*Primary Examiner* — Vu Le
*Assistant Examiner* — Guillermo Rivera-Martinez
(74) *Attorney, Agent, or Firm* — Harness, Dickey & Pierce, P.L.C.

(57) ABSTRACT

A method and a system for monitoring a bolus value are disclosed. The method includes contrast-agent-assisted test recording of a time series of test images of a region under examination, wherein one bolus value is determined in each of the respective test images, together with the change in the bolus values between at least two test images. The method includes regulating the time interval between the recordings of individual test images as a function of the change in the bolus values, thereby enabling the temporal resolution for determining the bolus value to be selected in such a way that it corresponds to the change in the bolus values. In this way the temporal resolution in the monitoring of bolus values is improved with a view to avoiding both too high and too low a recording rate for the test images.

11 Claims, 2 Drawing Sheets

(58) Field of Classification Search
CPC .... A61M 31/005; G06F 19/3468; G06T 7/20; G06T 2207/30004; G06T 2210/41; G06T 2211/404; G06T 2207/20148; G06T 7/0097

See application file for complete search history.

(56) References Cited

U.S. PATENT DOCUMENTS

| | | |
|---|---|---|
| 2002/0107438 A1 | 8/2002 | Liu |
| 2004/0114706 A1 | 6/2004 | Ikeda et al. |
| 2006/0178836 A1* | 8/2006 | Bai et al. ............... 702/19 |
| 2006/0239917 A1 | 10/2006 | Klotz et al. |
| 2007/0238956 A1* | 10/2007 | Haras et al. ............ 600/407 |
| 2007/0258558 A1* | 11/2007 | Nishide et al. ............ 378/8 |
| 2008/0097196 A1* | 4/2008 | Licato et al. ........... 600/431 |
| 2008/0119715 A1* | 5/2008 | Gonzalez Molezzi et al. ............... 600/407 |
| 2008/0253634 A1 | 10/2008 | Hay et al. |
| 2009/0046911 A1* | 2/2009 | Inoue et al. ............ 382/130 |
| 2010/0027751 A1 | 2/2010 | Boese et al. |
| 2010/0249582 A1* | 9/2010 | Feuerlein et al. ....... 600/431 |
| 2011/0103542 A1* | 5/2011 | Allmendinger et al. ...... 378/4 |
| 2011/0235885 A1* | 9/2011 | Rauch et al. ............ 382/131 |
| 2011/0263973 A1 | 10/2011 | Bernhardt et al. |

FOREIGN PATENT DOCUMENTS

| | | |
|---|---|---|
| CN | 101185591 A | 5/2008 |
| CN | 101277648 A | 10/2008 |
| CN | 101366640 A | 2/2009 |
| CN | 102232845 A | 11/2011 |
| CN | 102364592 A | 2/2012 |
| DE | 102008035549 A1 | 2/2010 |
| JP | 2009039330 A | 2/2009 |

OTHER PUBLICATIONS

Bai et al., An Adaptive Optimal Control Design for a Bolus Chasing Computed Tomography Angiography, 2007, IEEE Transactions on Control Systems Technology, vol. 16, No. 1, pp. 60-69.*
Bai et al., Study of an adaptive bolus chasing CT angiography, 2006, Journal of X-Ray Science and Technology 14, pp. 27-38.*
Aach et al., Transformation of Adaptive Thresholds by Significance Invariance for Change Detection, 2005 IEEE, pp. 637-642.*
German Office Action Dated Jun. 7, 2013.
Chinese Office Action and English translation thereof Apr. 3, 2015.

\* cited by examiner

DOSE- AND TIME-OPTIMIZED MONITORING OF BOLUS VALUES

PRIORITY STATEMENT

The present application hereby claims priority under 35 U.S.C. §119 to German patent application numbers DE 102012216931.8 filed Sep. 20, 2012, the entire contents of each of which are hereby incorporated herein by reference.

FIELD

At least one embodiment of the invention generally relates to a method and a system for monitoring a bolus value.

BACKGROUND

Contrast-agent-assisted images are recorded by imaging methods such as magnetic resonance tomography (MRT) and computed tomography (CT) primarily for diagnostic purposes. The contrast agent is administered to the patient prior to the recording of a diagnostic image and permits imaging with specific contrast, in particular in order to observe perfusion processes.

For contrast-agent-assisted recording of diagnostic images it is important that the recording is carried out at the right instant in time. If the diagnostic image is recorded too early or too late, it will not be possible to derive the desired information from the recording.

In order to determine the right time instant for the recording of a diagnostic image, test images are recorded as a means of monitoring the uptake of the contrast agent. Typically, the test images are recorded at intervals of a few seconds, and from them is derived what is termed a bolus value which characterizes the uptake of the contrast agent. The actual recording of a diagnostic image is started if the bolus value exceeds a threshold value.

A problematic aspect is that if the frequency with which the test images are recorded is low, then the temporal resolution for determining the time instant at which the bolus value exceeds a threshold value will also be low. Conversely, a high test image recording rate is at the expense of increased cost, time and effort, and, in the case of an x-ray examination, also an increased dose for the patient.

A method for bolus tracking is known from US 2010/0249582 A1. This method entails the recording of a baseline image or a plurality of baseline images as well as an automatic establishment of a trigger region or a plurality of trigger regions within the one baseline image or within each of the plurality of baseline images. The method also includes the checking of the automatically established trigger region or trigger regions for the arrival of a bolus in the trigger region or in the plurality of trigger regions. The method furthermore includes the forecasting of the arrival of the bolus in a selected volume, based on the arrival of the bolus in the one trigger region or in the plurality of trigger regions, as well as the acquisition of a diagnostic scan in the selected volume at the forecasted time.

SUMMARY

An embodiment of the invention seeks to improve the temporal resolution during the monitoring of bolus values. A method and a system are disclosed.

Features, advantages or alternative embodiment variants cited in the process are also equally applicable to the other claimed objects, and vice versa. In other words the physical entity claims, which are directed to a system for example, can also be developed using the features that are described or claimed in connection with a method. The corresponding functional features of the method are in this case embodied by corresponding physical entity modules.

An embodiment of the invention is based on the contrast-agent-assisted test recording of a time series of test images of a region under examination, wherein one bolus value in each case is determined in the test images, together with the change in the bolus values between at least two test images. An embodiment of the invention is based on the concept of regulating the time interval between the recordings of individual test images as a function of the change in the bolus values, thereby enabling the temporal resolution for determining the bolus value to be aligned with the speed of the change in the bolus values. In this way the temporal resolution in the monitoring of bolus values is improved with a view to avoiding both too high and too low a recording rate for the test images.

An embodiment of the invention relates to an imaging system, comprising a recording unit, embodied for contrast-agent-assisted test recording of a time series of test images of a region under examination, and comprising a determination unit, embodied for performing a first determination of one bolus value in each case in the test images, and embodied for performing a second determination of the change in the bolus values between at least two test images, and comprising a regulation unit, embodied for regulating the time interval between the recordings of individual test images as a function of the change in the bolus values.

BRIEF DESCRIPTION OF THE DRAWINGS

The invention is described and explained in more detail below with reference to the example embodiments illustrated in the figures, in which.

DETAILED DESCRIPTION OF THE EXAMPLE EMBODIMENTS

Figure 1:
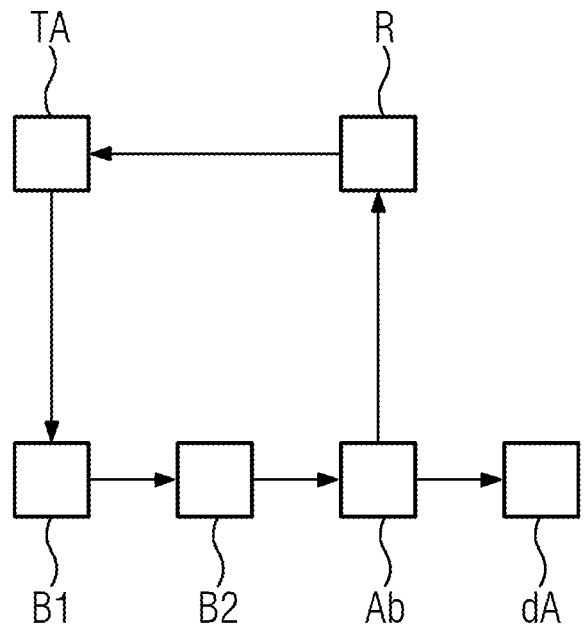
FIG. 1 is a flow diagram of the method for monitoring a bolus value.

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

An embodiment of the invention is based on the contrast-agent-assisted test recording of a time series of test images of a region under examination, wherein one bolus value in each case is determined in the test images, together with the change in the bolus values between at least two test images. An embodiment of the invention is based on the concept of regulating the time interval between the recordings of individual test images as a function of the change in the bolus values, thereby enabling the temporal resolution for determining the bolus value to be aligned with the speed of the change in the bolus values. In this way the temporal resolution in the monitoring of bolus values is improved with a view to avoiding both too high and too low a recording rate for the test images.

Also included as part of an embodiment of the invention is that a future bolus value in the region under examination is estimated on the basis of the change in the bolus values between at least two test images.

Also included as part of an embodiment of the invention is that the time instant is estimated at which a future bolus value will exceed at least one threshold value. By this means it is possible to start a specific action that is coupled to the exceeding of a threshold value at the right time instant.

Also included as part of an embodiment of the invention is that the time interval between the recordings of individual test images is regulated such that the time interval decreases with increasing bolus values. The higher recording rate of the test images as bolus values increase enables better estimation of the characteristic change in the bolus values and consequently of a future bolus value.

Also included as part of an embodiment of the invention is that the time interval between the recordings of individual test images is regulated such that the time interval attains a defined value as soon as a bolus value or the change in a bolus value between at least two test images exceeds a first threshold value. This enables the recording rate to be regulated in a particularly simple manner as a function of the bolus value or its change.

Also included as part of an embodiment of the invention is that the contrast-agent-assisted recording of a diagnostic image is initiated as soon as a bolus value exceeds a second threshold value. By this, it is ensured that the diagnostic image is recorded at the right time instant of the contrast agent uptake.

An embodiment of the invention relates to an imaging system, comprising a recording unit, embodied for contrast-agent-assisted test recording of a time series of test images of a region under examination, and comprising a determination unit, embodied for performing a first determination of one bolus value in each case in the test images, and embodied for performing a second determination of the change in the bolus values between at least two test images, and comprising a regulation unit, embodied for regulating the time interval between the recordings of individual test images as a function of the change in the bolus values.

Also included as part of an embodiment of the invention is an estimation unit, embodied for estimating a future bolus value in the region under examination on the basis of the change in the bolus values between at least two test images.

If the recording unit is embodied for recording images by way of x-ray radiation, an embodiment of the invention additionally leads to an improved ratio of dose exposure for the patient to temporal resolution in the monitoring of bolus values. This is because the variable recording rate (and hence the dose) that is dependent on the bolus values and their change is only increased if it serves to achieve a better temporal resolution.

The system and its developments are furthermore embodied for performing the cited methods in an advantageous manner.

FIG. 1 shows a flow diagram of the method for monitoring a bolus value. The method comprises a contrast-agent-assisted test recording TA of a time series of test images of a region under examination as well as a first determination B1 of one bolus value in each case in the test images and a second determination B2 of the change in the bolus values between at least two test images. The method further comprises estimating Ab a future bolus value in the region under examination on the basis of the change in the bolus values between at least two test images as well as regulating R the time interval between the recordings of individual test images as a function of the change in the bolus values. Finally, a contrast-agent-assisted diagnostic recording dA of a diagnostic image takes place as soon as a bolus value exceeds a second threshold value.

Generally, such agents are defined as contrast agent which improve the visualization of structures and functions of the body in imaging methods. Thus, on an x-ray image recorded without the assistance of contrast agents there are usually no blood vessels to be seen. If, for example, a solution containing iodine is injected as the contrast agent, the vessels into which the solution permeates throw x-ray shadows and are thus made visible. Contrast agents are usually distinguished from what are called tracers. A tracer is a synthetic, often radioactively marked native or foreign substance which, after being introduced into the living body, takes part in the metabolism and thereby allows or facilitates the most diverse types of examinations. Within the scope of the present application, contrast agents are to be understood both as conventional contrast agents and as tracers.

Generally, the region under examination can be any region of the body of a patient 3 which in the respective imaging modality acquires a specific contrast by means of contrast agent, in other words, for example, arteries, the heart, the kidneys, the liver, and other organs.

A test image and a diagnostic image are recorded by way of an imaging method such as MRT, rotational angiography or CT for medical purposes. However, the requirements in respect of a diagnostic image are higher, since it is intended to fulfill a diagnostic purpose. As a rule a diagnostic image is enhanced in terms of the imaged volume and/or the spatial resolution and/or the specific contrast by comparison with a test image.

Furthermore, diagnostic images are intended to be recorded at a time in the contrast agent uptake which permits parameters to be derived for clinical assessment purposes, in particular perfusion parameters. Within the meaning of the present application, in contrast, test images are used to determine parameters, in particular bolus values, which serve for determining the right time instant for recording the diagnostic image.

The contrast-agent-assisted test recording TA of a time series of test images means that a plurality of test images are recorded spaced apart at a certain time interval from one another. The time interval typically amounts to a few seconds. The following steps, such as the first determination B1 of a bolus value and the second determination B2 of the change in the bolus values or the regulation R of the time interval between the recordings of individual test images are performed, not after, but during the contrast-agent-assisted test recording TA of the time series of test images. This is because the bolus value in the first test image can already be determined during the recording of a second test image.

Test images and diagnostic images can represent both a surface and a volume. In other words they can be embodied in two-dimensional form and be made of elements called pixels, or they can be embodied in three-dimensional form and be made up of elements called voxels. A diagnostic image in particular can be based on a sampling or scanning process in which the region under examination is moved linearly and relative to the recording unit, for example by way of a patient couch 6 on which the patient 3 lies.

Furthermore, in many tomographic image acquisition methods, in particular in CT and in rotational angiography, the recording unit AE rotates around the region under examination in order to record projections at different angles. A test image is usually, though not necessarily, an essentially two-dimensional image. For example, a test image can be recorded during a single rotation of the recording unit AE of a CT scanner 1 without the region under examination being moved. The image is then a sectional image or slice of the patient 3.

Recording such a sectional image as a test image makes sense in the case of a CT scanner 1, because it allows rapid reconstruction of the test image owing to the relatively small volume of data generated in the course of a single rotation. If the recording rate of the test images is to be maximized, in the case of a CT scanner 1 the recording unit AE can also rotate continuously and record projections continuously during the rotation. Test images (in the form of sectional images) can then be continuously reconstructed from these projections and the time interval between said test images can in particular be less than half the rotation time of the recording unit AE. In this case the test images will overlap. Furthermore, the test images can also be topograms, that is to say two-dimensional projections which are acquired by way of a linear sampling or scanning process of the recording unit AE, and which provide an overview of a relatively large region of the patient 3.

Since, in the method according to an embodiment of the invention, the second determination B2 of the change in the bolus values is intended to be performed between at least two test images, it makes sense for the same region of the patient 3 to be imaged during the contrast-agent-assisted test recording TA of the series of test images. That said, however, the diagnostic image can include a different region from the examination region selected for the contrast-agent-assisted test recording TA of a series von test images. For example, the examination region for contrast-agent-assisted test recording TA of the series of test images can be a vein close to the heart, and the region that is to be recorded by means of the diagnostic image can be the heart itself.

By a bolus is understood the administration of a contrast agent, as an injection for example. By a bolus value, within the meaning of the application, is to be understood a parameter which characterizes the administration of the contrast agent and its distribution in the body of the patient 3, at least in the region under examination. A bolus value is, for example, an image signal in the form of an intensity in the region under examination, the signal originating from the bolus. The bolus value in the form of an intensity can be calculated by addition over the intensity values within the region under examination. If the described method is performed by means of a CT scanner, the bolus value can be specified as an HU value, in which case it is therefore determined in accordance with the Hounsfield scale.

A first determination B1 of one bolus value in each case in the test images consists in automatically detecting the region under examination, for example by segmentation, and also in determining the intensity (or a comparable image signal) in the detected region under examination. The second determination B2 of the change in the bolus values between at least two test images can be performed for example by subtraction, division or a comparison operation of the two bolus values.

The estimation Ab of a future bolus value in the region under examination on the basis of the change in the bolus values between at least two test images can be accomplished in a variety of ways. For example, the development of the bolus values over time can be interpolated with a predefined function, for example a piecewise linear function or a polynomial. A function can also be adapted to the variation over time of the bolus values, an exponential function for example. Prior knowledge of the contrast agent used and its properties or prior knowledge about the patient 3, such as the latter's age, size and gender, can be used in order to specify certain free parameters of a function that is to be adapted.

Furthermore, it is also possible to estimate the time instant at which a future bolus value will exceed at least one threshold value. Two types of threshold values are of interest in this case. If a first threshold value is exceeded, the time interval between the recordings of individual test images is regulated in such a way that the time interval attains a defined value. The first threshold value, just like the value defined for the time interval, can be input by the operator of the medical apparatus containing the recording unit AE, in other words a CT scanner for example, by means of an input unit 7 which is connected to the CT scanner by means of a computer 12 before the method according to the invention is performed. Just like the value defined for the time interval, the first threshold value can, on the other hand, already have been predefined or can be calculated as a function of other values that have been input. The other entered values can be in particular characteristics of or prior knowledge about the patient 3, such as the latter's age, size and gender. In any event the time interval can, depending on the embodiment of the method, attain a defined value as soon as a bolus value (or a change in bolus values between at least two test images) which exceeds the first threshold value has actually been measured in a test image. The time interval can, however, also attain the defined value as soon as a bolus value (or a change in bolus values) which exceeds the first threshold value is to be expected on the basis of the estimation.

As soon as a bolus value exceeds a second threshold value, the contrast-agent-assisted diagnostic recording dA of a diagnostic image is triggered. For this reason it is particularly important to estimate the time instant at which a future bolus value will exceed the second threshold value, for often a contrast-agent-assisted diagnostic recording dA of a diagnostic image is to be initiated precisely when the bolus value just exceeds a second threshold value.

In conjunction with the regulation R of the time interval between the recordings of individual test images as a function of the change in the bolus values, this thus permits a maximally precise estimation of the time instant at which a future bolus value will exceed a first or second threshold value. It namely makes sense in particular to regulate the time interval between the recordings of individual test images in such a way that the time interval decreases with increasing bolus values. As a result, the temporal resolution increases with increasing bolus values. Thus, the more the bolus value approaches the second threshold value, the greater becomes the temporal resolution, and the better the time instant can be determined at which the contrast-agent-assisted diagnostic recording dA of a diagnostic image is to be started.

Figure 2:
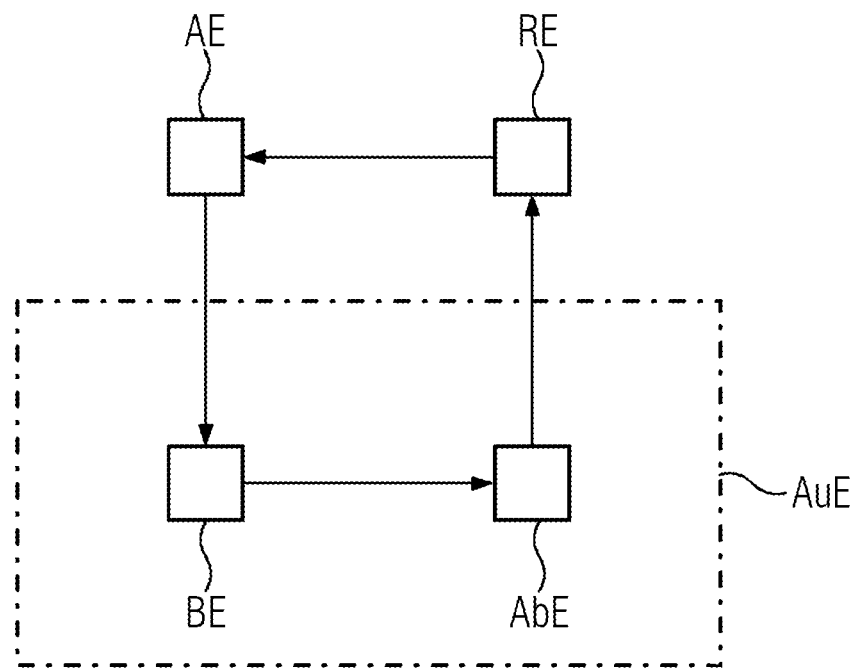
FIG. 2 shows an imaging system for monitoring a bolus value.

FIG. 2 shows an imaging system for monitoring a bolus value. The system comprises a recording unit AE, embodied for the contrast-agent-assisted test recording TA of a time series of test images of a region under examination. In one embodiment variant, the recording unit AE of the imaging system is configured for recording by means of x-ray radiation.

In addition, the system comprises a determination unit BE, embodied for a first determination B1 of one bolus value in each case in the test images, and embodied for a second determination B2 of the change in the bolus values between at least two test images. The system furthermore comprises an estimation unit AbE, embodied for estimating Ab a future bolus value in the region under examination on the basis of the change in the bolus values between at least two test images. The system additionally comprises a regulation unit RE, embodied for regulating R the time interval between the recordings of individual test images as a function of the change in the bolus values. In combination with the estimation unit AbE, the determination unit BE forms an evaluation unit AuE. The regulation unit RE, the determination unit BE and the estimation unit AbE can be implemented both as hardware and as software. For example, one of the units can be embodied as a so-called FPGA (acronym for "Field Programmable Gate Array") or comprise an arithmetic logic unit.

The units shown here are embodied in particular for performing the method described in FIG. 1. When the units shown here perform the method described in FIG. 1, they exchange data with one another. Thus, the recording unit AE transmits test images to the determination unit BE. The determination unit BE in turn transmits one or more bolus values as well as the change in bolus values to the estimation unit AbE. The estimation unit AbE uses the data coming from the determination unit BE in turn for estimating Ab a future bolus value as well as the time instant at which a future bolus value will exceed a threshold value.

The estimated bolus value and/or the time instant at which a threshold value is exceeded are/is transmitted to the regulation unit RE. The latter in turn forwards data to the recording unit AE for regulation R of the time interval between the recordings of individual test images. Accordingly, the units BE, RE, AbE and AuE cited here are also equipped with a memory which permits the units to store the respective data transmitted to or received by other units, and to process said data further.

Figure 3:
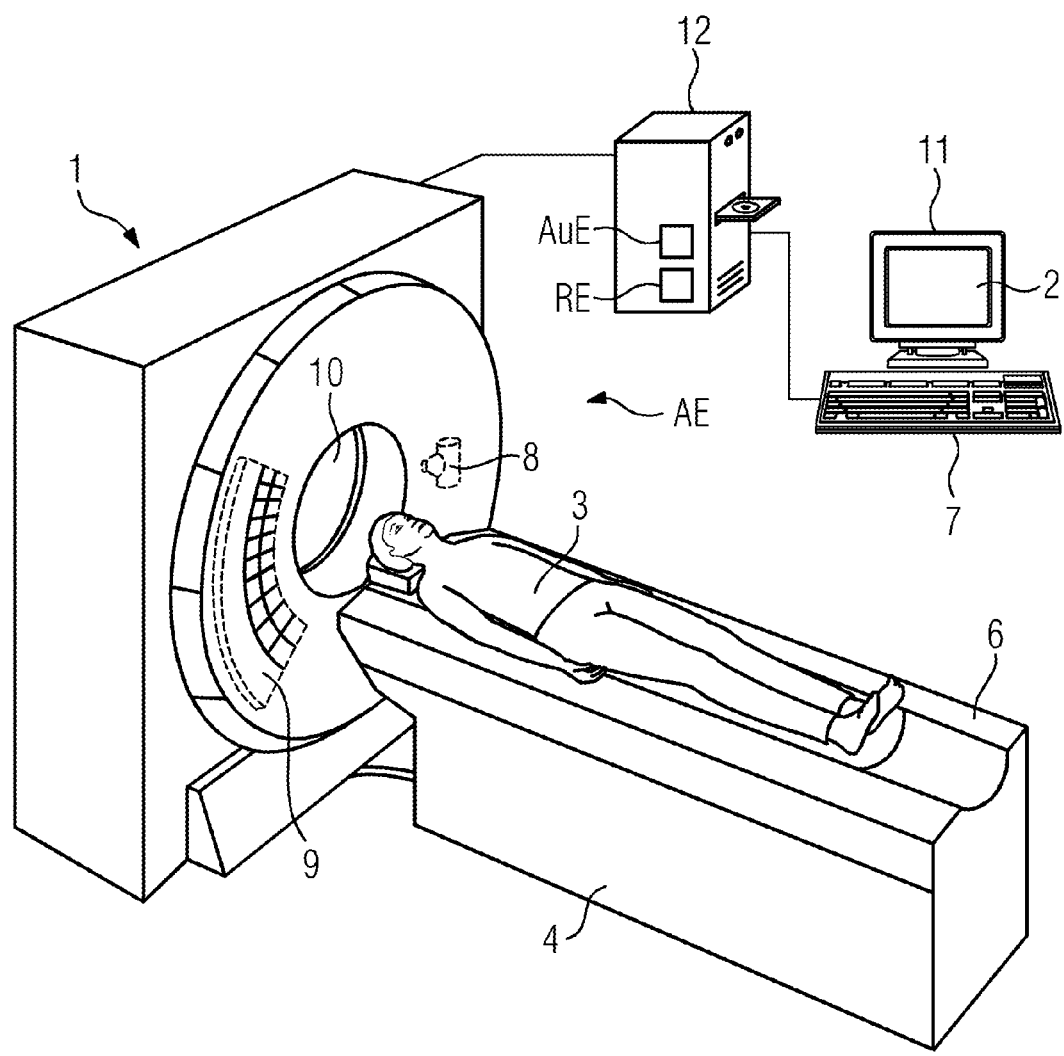
FIG. 3 shows an extended imaging system for monitoring a bolus value.

FIG. 3 shows an extended imaging system for monitoring a bolus value. The medical apparatus 1, in this case in the form of a CT scanner, possesses a recording unit AE, comprising a radiation emitter 8 and also comprising a radiation detector 9. The radiation emitter 8 for a CT scanner is typically an x-ray tube. The radiation detector 9 for a CT scanner is typically a linear or flat-panel detector, though it can also be embodied as a scintillator counter or CCD camera.

During the recording of an image, in particular a diagnostic image or a test image, the patient 3 lies on a patient couch 6 which is connected to a couch pedestal 4 in such a way that the latter supports the patient couch 6 together with the patient 3. The patient couch 6 is designed for the purpose of moving the patient 3 along a recording direction through the bore 10 of the recording unit AE.

Once the patient 3 is located at the right position so that images of the region under examination can be recorded, the method commences with the contrast-agent-assisted test recording TA of a time series of test images. Normally the patient couch 6 does not move during the contrast-agent-assisted test recording TA of a time series of test images. For the contrast-agent-assisted diagnostic recording dA of a diagnostic image, on the other hand, the patient 3 is usually moved further through the bore 10 by way of the patient couch 6 in order thereby to allow the contrast-agent-assisted diagnostic recording dA of a diagnostic image in the form of a three-dimensional image.

The medical apparatus 1 can also be an MRT device, for example. In the case of an MRT device the recording unit AE is embodied in the form of at least one RF coil. In this case a single RF coil can be embodied both as a radiation emitter 8 and as a radiation detector 9. The RF coil can be in particular a local coil, e.g. a head or thorax coil.

The recorded images of the medical apparatus 1 are sent to a computer 12 for processing and/or visualization. In the embodiment variant shown here, the computer 12 has both an evaluation unit AuE for evaluation purposes and a regulation unit RE for regulating R the time interval between the recordings of individual test images, each of said units being described in more detail with reference to FIG. 2. The evaluation unit AuE and the regulation unit RE can be embodied both in the form of hardware and in the form of software.

Both the evaluation unit AuE and the regulation unit RE or individual units of the evaluation unit AuE can be implemented on different devices. For example, the evaluation unit AuE can be embodied as part of a server, while the regulation unit RE can be embodied as part of the medical apparatus 1.

The computer 12 is connected to an output unit 11 and to an input unit 7. The output unit 11 is for example a (or a plurality of) LCD, plasma or OLED screen(s). The output 2 on the output unit 11 can for example comprise a graphical user interface for manual input of threshold values and additionally serves for visualizing the test images and/or the diagnostic image. The input unit 7 is for example a keyboard, a mouse, a touchscreen, or even a microphone for voice input.

Although the invention has been illustrated and described in more detail on the basis of the preferred example embodiments, the invention is not limited by the disclosed examples and other variations can be derived herefrom by the person skilled in the art without departing from the scope of protection of the invention. In particular it is possible to perform method steps in a different order from that specified.

What is claimed is:

1. A method of monitoring a bolus value, comprising:
    initiating flow of a contrast agent in a patient;
    constantly monitoring flow of the contrast agent in the patient using an imaging device;
    contrast-agent-assisted test recording of a time series of test images of a region patient under examination in the imaging device, the test images being of a first type sufficient only to determine a bolus value;
    determining via a processor, in a first determination, one bolus value in each respective one of the test images during the test recording, the bolus value being an image signal received in the imaging device;
    determining via the processor, in a second determination, a change in the bolus values between at least two test images during the test recording, the bolus values being image signals received in the imaging device;
    estimating via the processor, a future bolus value in the region under examination on the basis of the change in the bolus values between at least two test images during the test recording;
    regulating via the processor, a time interval between the recordings of individual test images as a function of the change in the bolus values during the test recording, wherein the function of the change in bolus values is adapted to a variation in the bolus values over time and includes parameters related to properties of contrast agents used in the method and parameters related to the patient under examination; and
    recording of a diagnostic image based on the determined and estimated bolus values of the at least two test images obtained during the test recording, wherein the time interval between the recordings of individual test images is regulated in such a way that the time interval decreases with increasing bolus values, the diagnostic image being of a second type enhanced in terms of imaged volume and/or the spatial resolution and/or the specific contrast by comparison with the test image, wherein the test images are images of a patient stationary relative to the imaging device and the diagnostic image is an image of a patient moving relative to the imaging device.

2. The method of claim 1, wherein the time instant at which a future bolus value will exceed at least one threshold value is estimated.

3. The method of claim 1, wherein the time interval between the recordings of individual test images is regulated in such a way that the time interval attains a defined value as soon as a bolus value or the change in bolus values between at least two test images exceeds a first threshold value.

4. The method of claim 2, further comprising:
    contrast-agent-assisted diagnostic recording of a diagnostic image as soon as a bolus value exceeds a second threshold value.

5. An imaging system for monitoring a bolus value, comprising:
    memory storing computer-readable instructions; and
    one or more processors configured to execute the computer-readable instructions such that the one or more processors are configured to perform operations including,
    contrast-agent-assisted test recording of a time series of test images of a region under examination, the test images being of a first type sufficient only to determine a bolus value;
    determining one bolus value in each respective one of the test images during the test recording, the bolus value being an image signal received by the one or more processors, and determining a change in the bolus values between at least two test images during the test recording, the bolus values being image signals received in the one or more processors;

estimating, during the test recording, a future bolus value in the region under examination on the basis of the change in the bolus values between at least two test images;

regulating, during the test recording, a time interval between the recordings of individual test images as a function of the change in the bolus values, wherein the function of the change in bolus values is adapted to a variation in the bolus values over time and includes parameters related to properties of contrast agents used in the method and parameters related to the patient under examination; and recording of a diagnostic image based on the determined and estimated bolus values of the at least two test images obtained during the test recording, wherein the time interval between the recordings of individual test images is regulated in such a way that the time interval decreases with increasing bolus values, the diagnostic image being of a second type enhanced in terms of imaged volume and/or the spatial resolution and/or the specific contrast by comparison with the test image, wherein the test image is an image of a patient stationary relative to the imaging device and the diagnostic image is an image of a patient moving relative to the imaging device.

6. The imaging system of claim 5, further comprising an x-ray emitting device to record the images of the region under examination.

7. The method of claim 2, wherein the time interval between the recordings of individual test images is regulated in such a way that the time interval attains a defined value as soon as a bolus value or the change in bolus values between at least two test images exceeds a first threshold value.

8. The method of claim 7, further comprising:
contrast-agent-assisted diagnostic recording of a diagnostic image as soon as a bolus value exceeds a second threshold value.

9. The method of claim 1, wherein the function is adapted to a variation in the bolus values over time by specifying free parameters of the function.

10. The imaging system of claim 5, wherein the function is adapted to a variation in the bolus values over time by specifying free parameters of the function.

11. The method of claim 1, wherein the test images are images of the patient stationary on a patient couch relative to the imaging device and the diagnostic image is an image of the patient on the patient couch moving relative to the imaging device.

* * * * *

UNITED STATES PATENT AND TRADEMARK OFFICE
CERTIFICATE OF CORRECTION

PATENT NO.         : 9,672,613 B2                                         Page 1 of 1
APPLICATION NO.    : 14/023682
DATED              : June 6, 2017
INVENTOR(S)        : Ute Feuerlein et al.

It is certified that error appears in the above-identified patent and that said Letters Patent is hereby corrected as shown below:

On the Title Page

(72) Inventors should read: Robert Lapp, Neurnberg (DE)

Signed and Sealed this
Seventeenth Day of April, 2018

Andrei Iancu
*Director of the United States Patent and Trademark Office*